US012280622B2

United States Patent
Jo et al.

(10) Patent No.: US 12,280,622 B2
(45) Date of Patent: Apr. 22, 2025

(54) WHEEL AND MOVABLE OBJECT INCLUDING THE SAME

(71) Applicants: Hyundai Motor Company, Seoul (KR); Kia Corporation, Seoul (KR); MOBINN Inc., Suwon-si (KR)

(72) Inventors: Sun Myoung Jo, Ansan-si (KR); Jin Choi, Seoul (KR); Hoon Chung, Hwaseong-si (KR)

(73) Assignees: HYUNDAI MOTOR COMPANY, Seoul (KR); KIA CORPORATION, Seoul (KR); MOBINN INC., Suwon-si (KR)

( * ) Notice: Subject to any disclaimer, the term of this patent is extended or adjusted under 35 U.S.C. 154(b) by 414 days.

(21) Appl. No.: 17/545,186

(22) Filed: Dec. 8, 2021

(65) Prior Publication Data

US 2022/0388339 A1    Dec. 8, 2022

(30) Foreign Application Priority Data

Jun. 3, 2021    (KR) ........................ 10-2021-0072381

(51) Int. Cl.
*B60C 7/14*    (2006.01)
*B60B 9/28*    (2006.01)

(52) U.S. Cl.
CPC ................ *B60C 7/146* (2021.08); *B60B 9/28* (2013.01); *B60B 2900/313* (2013.01); *B60B 2900/551* (2013.01)

(58) Field of Classification Search
CPC .... B60C 7/10; B60C 7/14; B60B 9/24; B60B 9/26; B60B 9/28; B60B 19/00; B60B 2900/313; B60B 2900/551; A61G 5/061; A61G 5/06
See application file for complete search history.

(56) References Cited

U.S. PATENT DOCUMENTS

| | | | |
|---|---|---|---|
| 2,496,924 A * | 2/1950 | Weeks | B60B 15/04 |
| | | | 301/51 |
| 6,239,532 B1 * | 5/2001 | Hollenbeck | H02K 29/08 |
| | | | 310/68 B |
| 7,743,806 B2 | 6/2010 | Abe | |
| 2007/0290548 A1 * | 12/2007 | Lundy | B60B 7/01 |
| | | | 301/37.24 |
| 2008/0073014 A1 | 3/2008 | Abe | |
| 2011/0080038 A1 * | 4/2011 | Tan | B60B 25/02 |
| | | | 301/62 |

(Continued)

FOREIGN PATENT DOCUMENTS

| | | |
|---|---|---|
| CN | 212022191 U | 11/2020 |
| JP | 2008074345 A | 4/2008 |

(Continued)

*Primary Examiner* — S. Joseph Morano
*Assistant Examiner* — Eva L Comino
(74) *Attorney, Agent, or Firm* — SLATER MATSIL, LLP

(57) ABSTRACT

An embodiment wheel includes a frame configured to rotate about an axial direction, an absorber coupled to a side of the frame in a radially outward direction, and a connector connecting the absorber and the frame, wherein a first portion of the connector is configured to be movable along the radially outward direction and a radially inward direction of the frame, and a second portion of the connector is configured to be rotatable on a plane that crosses the axial direction.

18 Claims, 10 Drawing Sheets

(56) References Cited

U.S. PATENT DOCUMENTS

| | | | |
|---|---|---|---|
| 2018/0201058 A1 | 7/2018 | Apollonio et al. | |
| 2020/0276865 A1* | 9/2020 | Jo | B60C 7/14 |
| 2021/0070103 A1* | 3/2021 | Tsuji | B60C 7/14 |

FOREIGN PATENT DOCUMENTS

| | | | |
|---|---|---|---|
| JP | 2019521027 A | 7/2019 | |
| KR | 20120071187 A | 7/2012 | |
| KR | 20200105131 A | 9/2020 | |

\* cited by examiner

WHEEL AND MOVABLE OBJECT INCLUDING THE SAME

CROSS-REFERENCE TO RELATED APPLICATIONS

This application claims the benefit of Korean Patent Application No. 10-2021-0072381, filed in the Korean Intellectual Property Office on Jun. 3, 2021, which application is hereby incorporated herein by reference.

TECHNICAL FIELD

The present disclosure relates to a wheel and a movable object including the same.

BACKGROUND

In general, a wheel refers to a round object that is coupled to a shaft for the purpose of rotation. Conventionally, wheels are utilized for a means for moving on a flat surface, but in recent years, wheel for rising on ground surfaces, such as stairs, which are not flat have been developed.

In order to continuously climb stairs, a shape of a tire of a wheel has to be changed such that the stairs are climbed like a ramp. When a tire formed of a rubber having an insufficient flexibility has a low impact absorption rate, an obstacle such as a low step may be overcome, but it is difficult to overcome a continuous obstacle such as stairs. Accordingly, in order to continuously climb the stairs, a tire of a rubber material having a sufficient flexibility has to be used.

However, when the tire of a rubber material having the flexibility is used, the tire may be bent by a distortion force when the wheel is rotated. Although a structure that connects a beam structure for preventing deflection of a wheel to a plate has been utilized conventionally, a bolt may be unfastened and wear occurs due to surface-frictions between the beam and the plate in the structure.

Furthermore, oil has to be injected to solve the frictions between the beam and the plate, and accordingly, oil may spatter.

SUMMARY

Embodiments of the present disclosure can solve problems occurring in the prior art while advantages achieved by the prior art are maintained intact.

An embodiment of the present disclosure provides a wheel that does not require injection of oil for lubrication while not causing surface-frictions, and a movable object including the same.

The technical problems that may be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a wheel includes a frame that rotates about an axial direction, an absorber coupled to a side of the frame in a radially outward direction, and a connector connecting the absorber and the frame, and a portion of the connector is movable along the radially outward direction and a radially inward direction of the frame, and another portion of the connector is rotatable on a plane that crosses the axial direction.

In another example, the connector may include a first connection member including a first opening opened toward the radially outward direction, and connected to the frame to be rotatable, and a guide member, a portion of which is inserted into the first opening, extending along the radially outward direction, of which a distal end in the radially outward direction is connected to the absorber, and being movable along the radially outward direction and the radially inward direction.

In another example, the first connection member may include a (1-1)-th part formed to be perpendicular to the radially outward direction and having the first opening, and a (1-2)-th part being perpendicular to the (1-1)-th part and connected to the frame to be rotatable.

In another example, the connector may further include a second connection member coupled to a surface of the (1-1)-th part in the radially inward direction and through which the guide member passes.

In another example, the connector may further include a first shaft extending in the axial direction, coupled to the (1-2)-th part to be rotatable, and passing through the frame, the absorber, and the (1-2)-th part.

In another example, the guide member may include a guide member body extending toward the radially outward direction, and an insertion hole formed at a distal end of the guide member body in the radially outward direction, and the connector may further include a second shaft extending in the axial direction, inserted into the insertion hole to be rotatable, and passing through a distal end of the absorber in the radially outward direction.

In another example, the connector may further include a first spacer inserted between the absorber and the first shaft, and supporting the first shaft, and a second spacer inserted between the absorber and the second shaft and supporting the second shaft.

In another example, the wheel may further include at least one of a first bearing disposed between the absorber and the guide member and surrounding the second shaft, and a second bearing disposed between the absorber and a distal end of the second shaft in an opposite direction to the axial direction, and surrounding the second shaft.

In another example, the absorber may include a circular first absorption member connected to the frame, a circular second absorption member spaced apart from the first absorption member in the radially outward direction, and a third absorption member connecting one point of the first absorption member and one point of the second absorption member.

In another example, the third absorption member may elastically support the second absorption member on the first absorption member.

In another example, the third absorption member may extend between the first absorption member and the second absorption member in an inclined direction to form an angle with the radially outward direction.

In another example, the third absorption member may extend in a curved shape.

In another example, the first to third absorption members may be integrally formed.

In another example, the frame may include a first frame member connected to a side of the absorber in the axial direction, a second frame member connected to a side of the absorber in an opposite direction to the axial direction, and a third frame member extending in the axial direction and connecting the first frame member and the second frame member.

In another example, the third frame member may connect a distal end of the first frame member in the radially inward direction and a distal end of the second frame member in the radially inward direction.

In another example, the connector may further include a first shaft extending in the axial direction and passing through the absorber, and the wheel may include at least one of a third bearing disposed between the first frame member and the connector and surrounding the first shaft, and a fourth bearing disposed between the second frame member and a distal end of the first shaft, in an opposite direction to the axial direction, and surrounding the first shaft.

In another example, the first connection member and the guide member may be spaced apart from the frame in the axial direction.

According to an embodiment of the present disclosure, a movable object includes a body including a shaft, and a wheel coupled to the shaft to be rotatable, the wheel may include a frame coupled to the shaft to be rotatable, an absorber coupled to a radially outer side of the frame, and a connector connecting the absorber and the frame, and a portion of the connector may be movable along a radially outward direction and a radially inward direction of the frame, and another portion of the connector may be rotatable on a plane that crosses an axial direction, in which the shaft extends.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 1 is viewed from another direction;

DETAILED DESCRIPTION OF ILLUSTRATIVE EMBODIMENTS

Figure 1:
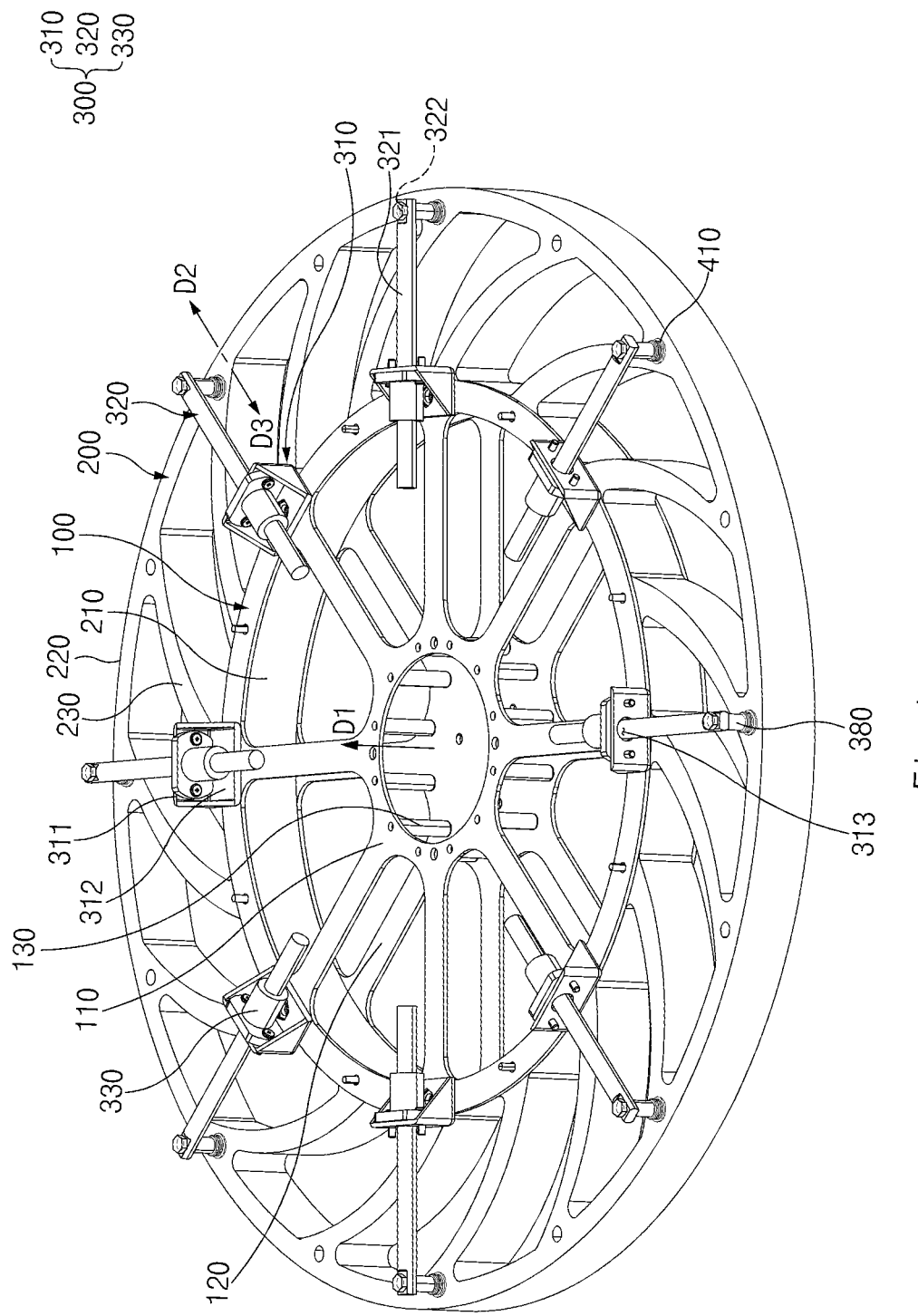
FIG. 1 is a view illustrating a wheel according to an embodiment of the present disclosure.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of embodiments of the present disclosure, a detailed description of known functions and configurations incorporated herein will be omitted when it may make the subject matter of the present disclosure rather unclear.

Figure 2:
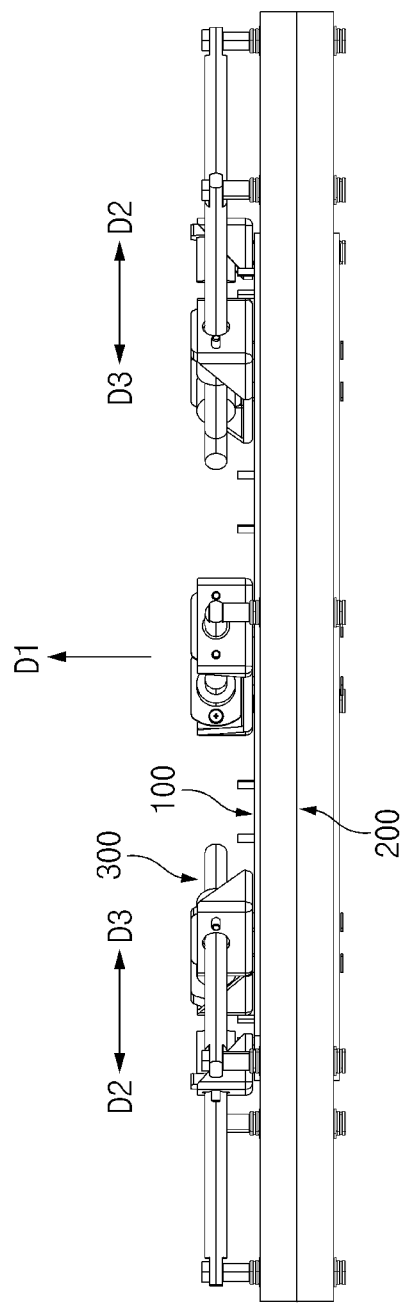
FIG. 2 is a view when
Figure 3:
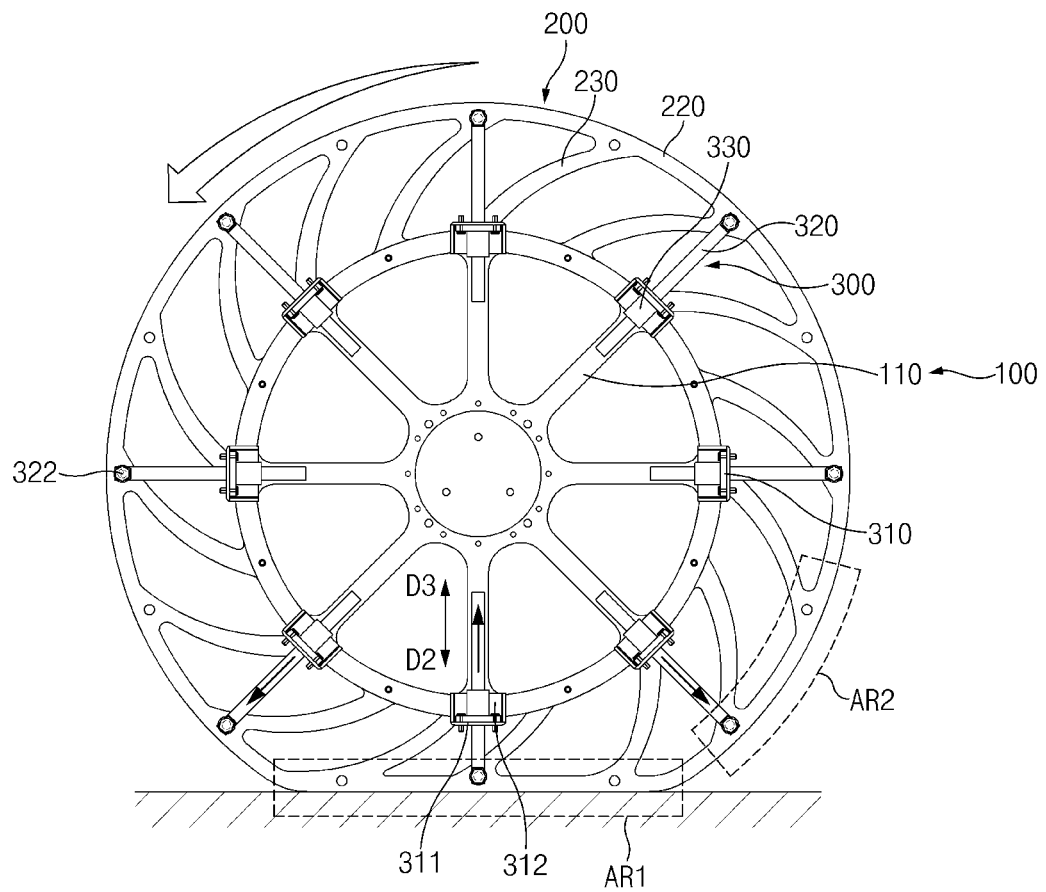
FIG. 3 is a view illustrating a state in which a wheel moves on a flat ground according to an embodiment of the present disclosure.
Figure 4:
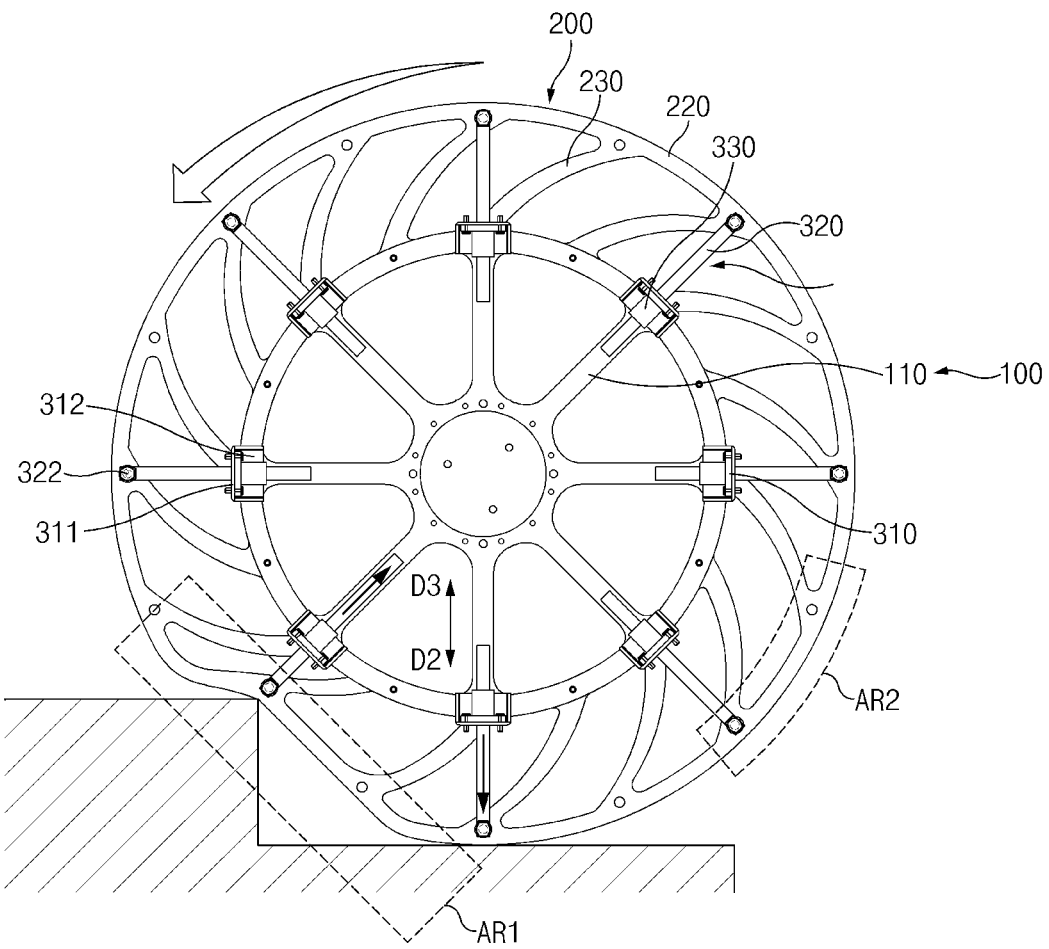
FIG. 4 is a view illustrating a state in which a wheel moves on stairs according to an embodiment of the present disclosure.

FIG. 1 is a view illustrating a wheel according to an embodiment of the present disclosure. FIG. 2 is a view when FIG. 1 is viewed from another direction. FIG. 3 is a view illustrating a state in which a wheel moves on a flat ground according to an embodiment of the present disclosure. FIG. 4 is a view illustrating a state in which a wheel moves on stairs according to an embodiment of the present disclosure.

Wheel

A wheel according to an embodiment of the present disclosure is a wheel that may move on ground surfaces, such as stairs, which are not flat. As illustrated in FIG. 1, the wheel according to the embodiment of the present disclosure may include a frame 100, an absorber 200, and a connector 300. The frame 100 may be configured to be rotatable about an axial direction D1. The absorber 200 may be coupled to a side of the frame 100 in a radially outward direction D2. The absorber 200 may be a tire. The connector 300 may connect the absorber 200 and the frame 100. The contents on the axial direction D1, the radially outward direction D2, and a radially inward direction D3 are illustrated in FIG. 2 and the like.

A portion of the connector 300 may be movable along the radially outward direction D2 and the radially inward direction D3 of the frame 100. The above-described portion may correspond to a guide member 320, which will be described below.

For example, when the absorber 200 contacts a ground surface, a length of a portion of the absorber 200 is decreased along the radially outward direction D2 due to pressing of the ground surface, and accordingly, a portion of the connector 300 may be movable to allow the deformation. That is, due to the shape, the wheel according to the embodiment of the present disclosure, as illustrated in FIG. 4, may move on a ground surface that is not flat. As illustrated in FIG. 3, it is apparent that the wheel may move on a flat ground.

Furthermore, another portion of the connector 300 may be rotatable on the flat surface that crosses the axial direction D1. More preferably, still another portion of the connector 300 may be rotatable on a flat surface that is perpendicular to the axial direction D1. Then, the rotation may be rotation about a first shaft 340, which will be described below.

The still another portion may correspond to a first connection member 310, which will be described below, in more detail, a (1-2)-th part 312. As the still another portion of the connector 300 is rotatable, a bearing may be utilized, and accordingly, for the wheel according to the embodiment of the present disclosure, a necessity of oil for preventing wear due to surface frictions or the surface frictions may be reduced. The details will be described in a description of the first to fourth bearings 410, 420, 430, and 440, which will be described below.

Figure 5:
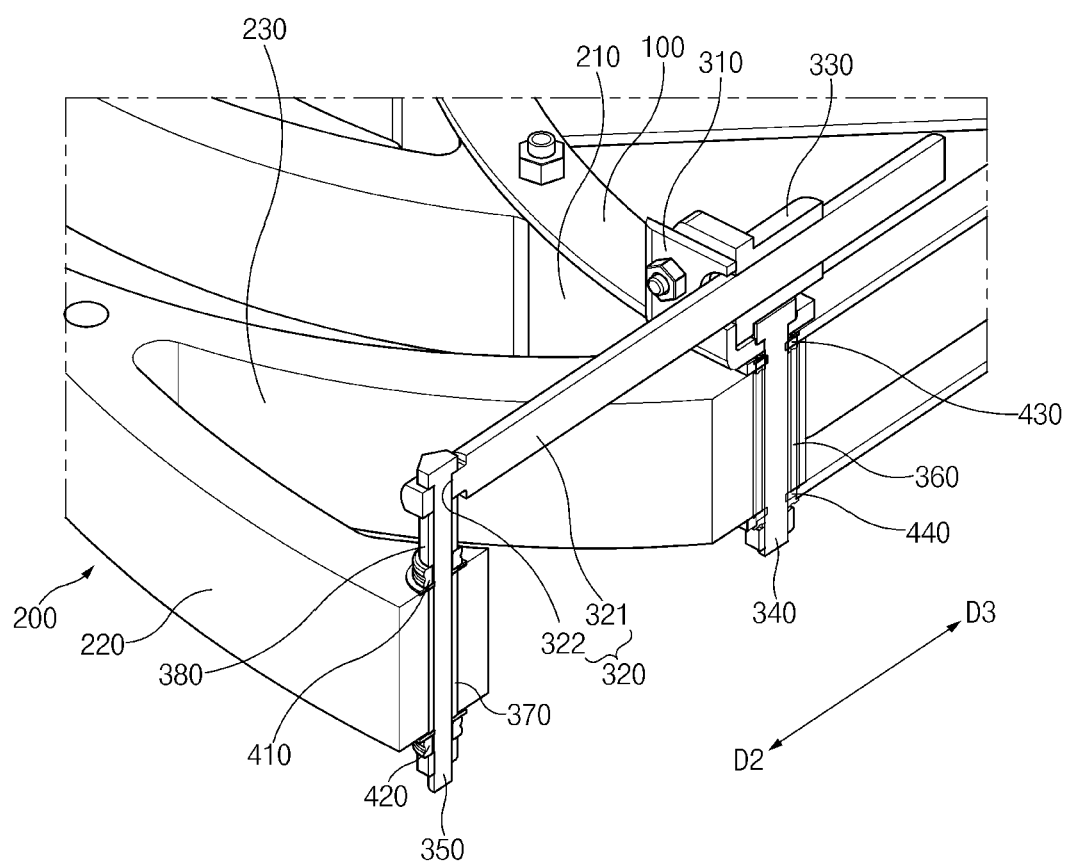
FIG. 5 is a cutaway perspective view of FIG. 1.
Figure 6:
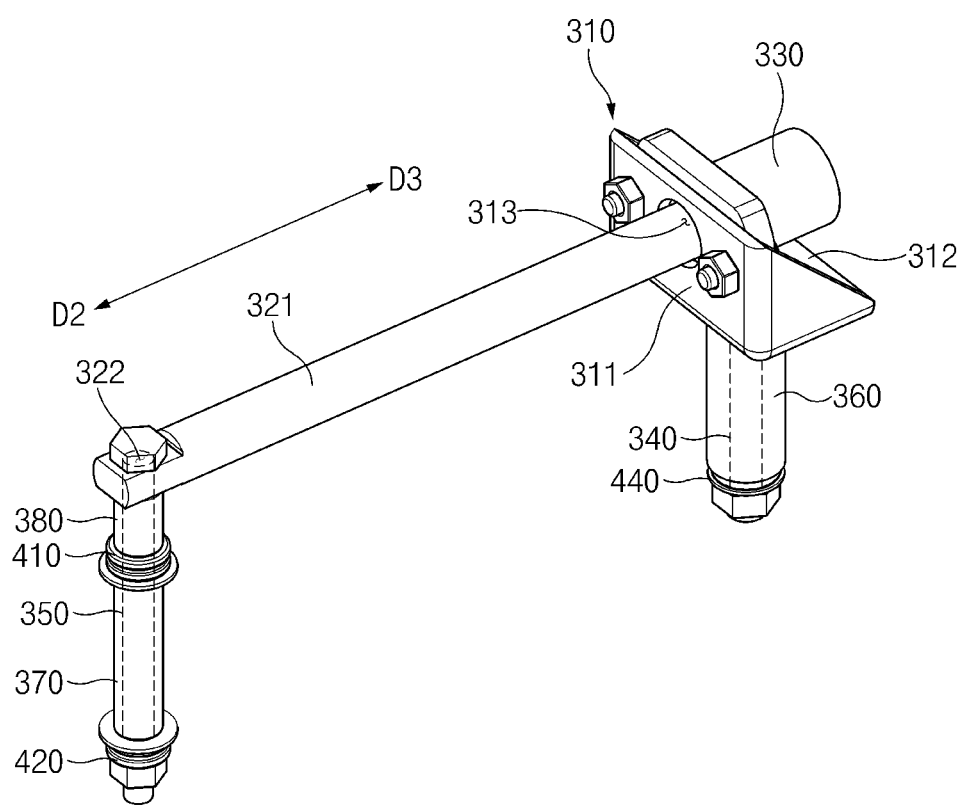
FIGS. 6 and 7 are views illustrating a connector of a wheel according to an embodiment of the present disclosure.
Figure 7:
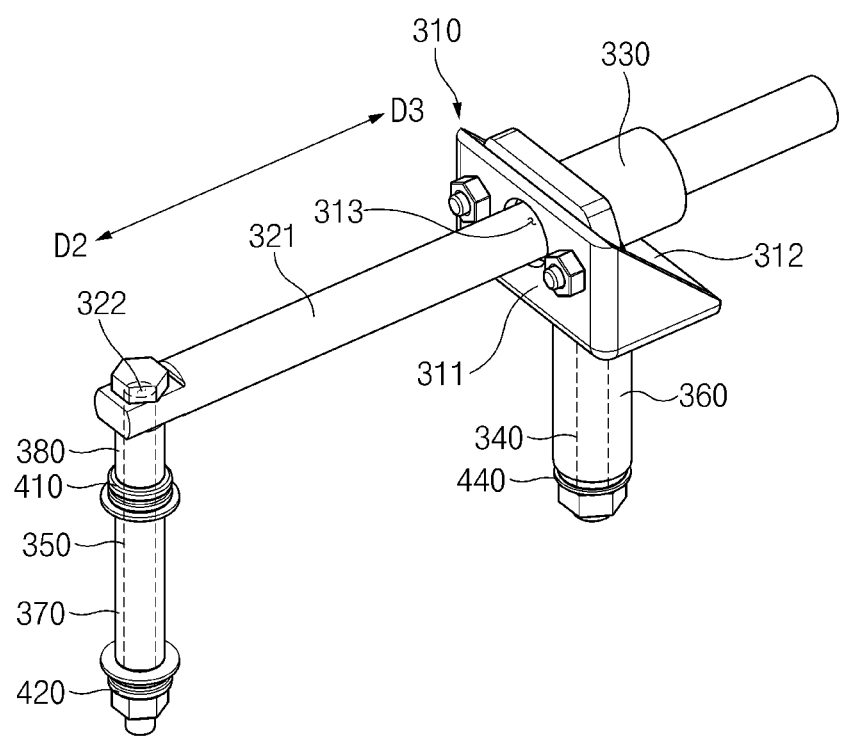

Hereinafter, a detailed shape of the connector 300 will be described below with reference to FIGS. 5-7. FIG. 5 is a cutaway perspective view of FIG. 1. FIGS. 6 and 7 are views illustrating the connector 300 of a wheel according to an embodiment of the present disclosure.

First Connection Member 310

The connector 300 may include the first connection member 310. As illustrated in FIG. 6, the first connection member 310 may include a first opening 313. The first opening 313 may be opened toward the radially outward direction D2. The guide member 320, which will be described below, may be inserted into the first opening 313. The first connection member 310 may be connected to the frame 100 to be rotatable. Here, the connection does not mean a connection through direct contact but is a concept that includes an indirect connection through another member.

As illustrated in FIG. 1, the first connection member 310 may be spaced apart from the frame 100 in the axial direction D1. The third bearing 430, which will be described below, may be inserted between the first connection member 310 and the frame 100. Accordingly, surface frictions between the first connection member 310 and the frame 100 may be minimized.

The first connection member 310 may include a (1-1)-th part 311 and the (1-2)-th part 312. The (1-1)-th part 311 may be perpendicular to the radially outward direction D2, and the first opening 313 may be formed therein. The (1-2)-th part 312 may be perpendicular to the (1-1)-th part 311, and may be connected to the frame 100 to be rotatable.

Guide Member 320

Furthermore, the connector 300 may include the guide member 320. A portion of the guide member 320 may be inserted into the first opening 313. The guide member 320 may extend along the radially outward direction $D_2$, and a distal end of the guide member 320 in the radially outward direction D2 may be connected to the absorber 200. The guide member 320 may be movable along the radially outward direction D2 and the radially inward direction D3. Accordingly, the guide member 320 may be moved in correspondence to a change in a shape of the absorber 200. FIG. 6 illustrates a state in which the guide member 320 is moved in the radially outward direction D2, and FIG. 7 is a state in which the guide member 320 is moved in the radially inward direction D3.

As illustrated in FIG. 5, the guide member 320 may include a guide member body 321 and an insertion hole 322. The guide member body 321 may extend toward the radially outward direction D2. The insertion hole 322 may be formed at a distal end of the guide member body 321 in the radially outward direction D2. A second shaft 350, which will be described below, may be inserted into the insertion hole 322.

The guide member 320 may be spaced apart from the frame 100 in the axial direction D1. Because the guide member 320 is inserted into the first opening 313 and the first connection member 310 is spaced apart from the frame 100 in the axial direction D1, the guide member 320 also is spaced apart from the frame 100 in the axial direction D1. Meanwhile, the guide member 320 is connected to the absorber 200, and the first bearing 410, which will be described below, may be inserted between the guide member 320 and the absorber 200.

Second Connection Member 330

The connector 300 may further include the second connection member 330. The second connection member 330 may be coupled to a surface of the (1-1)-th part 311 in the radially inward direction $D_3$, and the guide member 320 may pass through the second connection member 330. The second connection member 330 may be understood as a component for guiding movements of the guide member 320 in the radially outward direction D2 and the radially inward direction D3.

First Shaft 340 and Second Shaft 350

As illustrated in FIG. 5, the connector 300 may further include the first shaft 340 and the second shaft 350. The first shaft 340 may extend in the axial direction D1, and may be coupled to the (1-2)-th part 312. The first shaft 340 may pass through the frame 100, the absorber 200, and the (1-2)-th part 312. The second shaft 350 may extend in the axial direction D1, may be inserted into the insertion hole 322 to be rotatable, and may pass through a distal end of the absorber 200 in the radially outward direction D2. The second shaft 350 may have a length along the axial direction Di, which is larger than that of the first shaft 340. This may be caused by a location difference between the (1-2)-th part 312 and the guide member 320.

First Spacer 360 and Second Spacer 370

The connector 300 may further include a first spacer 360 and a second spacer 370. The first spacer 360 may be inserted between the absorber 200 and the first shaft 340 and may support the first shaft 340. The first spacer 360 may be disposed to surround the first shaft 340. The second spacer 370 may be inserted between the absorber 200 and the second shaft 350 and may support the second shaft 350. The second spacer 370 may be disposed to surround the second shaft 350.

The connector 300 may further include a third spacer 380. The third spacer 380 may be disposed on a side of the second spacer 370 in the axial direction D1. A distal end of the third spacer 380 in the axial direction D1 may contact the guide member 320.

First to Fourth Bearings 410, 420, 430, and 440

Meanwhile, the wheel according to the embodiment of the present disclosure may include at least one of the first to fourth bearings 410, 420, 430, and 440. The first to fourth bearings 410, 420, 430, and 440 may be configured to reduce frictions between two objects that contact each other at their locations. The first to fourth bearings 410, 420, 430, and 440 may be thrust bearings.

The first bearing 410 may be disposed between the absorber 200 and the guide member 320 and may surround the second shaft 350. In more detail, the first bearing 410 may be disposed to contact the absorber 200 and the third spacer 380 therebetween. Due to the first bearing 410, surface-frictions between the absorber 200 and the third spacer 380 may be minimized.

The second bearing 420 may be disposed between a distal end of the second shaft 350 in an opposite direction to the axial direction D1 and the absorber 200, and may surround the second shaft 350. Due to the second bearing 420, surface-frictions between the distal end of the second shaft 350 in the opposite direction to the axial direction Di and the absorber 200 may be minimized.

The third bearing 430 may be disposed between a first frame member 110 and the connector 300 and may surround the first shaft 340. Due to the third bearing 430, surface-frictions between the first frame member 110 and the connector 300 may be minimized.

The fourth bearing 440 may be disposed between a distal end of the first shaft 340 in an opposite direction to the axial direction D1 and a second frame member 120, and may surround the first shaft 340. Due to the fourth bearing 440, surface-frictions between the distal end of the first shaft 340 in the opposite direction to the axial direction D1 and the second frame member 120 may be minimized.

Absorber 200

Figure 8:
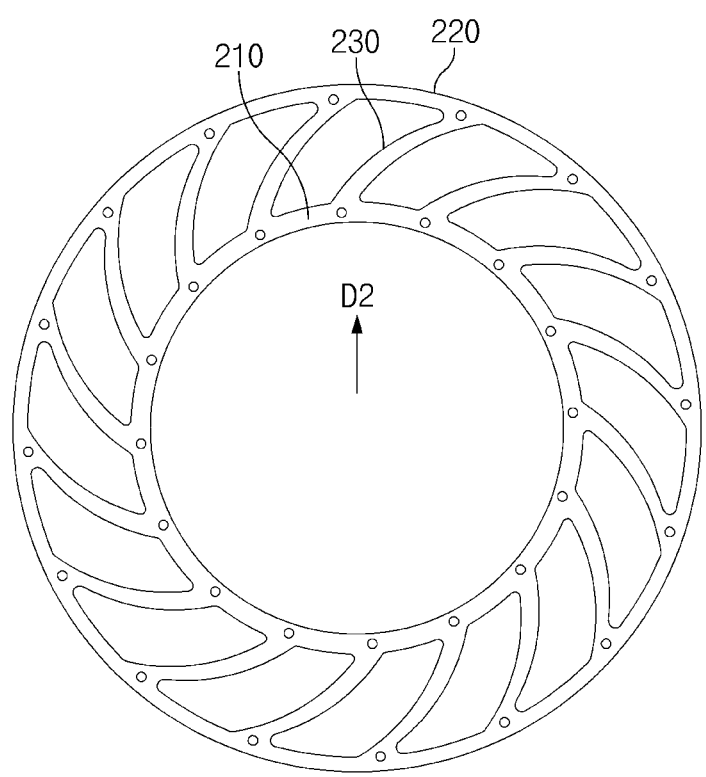
FIG. 8 is a view illustrating an absorber of a wheel according to an embodiment of the present disclosure.

FIG. 8 is a view illustrating the absorber 200 of a wheel according to an embodiment of the present disclosure. Hereinafter, a detailed shape of the absorber 200 will be described. The absorber 200 may include first to third absorption members 210, 220, and 230. The first absorption member 210 may be a circular member connected to the frame 100. The second absorption member 220 may be a circular member that is spaced apart from the first absorption member 210 in the radially outward direction D2. The third absorption member 230 may connect one point of the first absorption member 210 and one point of the second absorption member 220. Although the terms of the first to third absorption members 210, 220, and 230 for convenience of description are used, the first to third absorption members 210, 220, and 230 may be integrally formed.

The third absorption member 230 may be configured to elastically support the second absorption member 220 on the first absorption member 210. For example, the third absorption member 230 may be formed of an elastic material, a shape of which may be reversibly deformed. As the third absorption member 230 is configured to elastically support the second absorption member 220 on the first absorption member 210, the third absorption member 230 may return the second absorption member 220 to an original state by a restoring force when the pressing of the ground surface disappears even after the second absorption member 220 is deformed due to the pressing of the ground surface.

Furthermore, the third absorption member 230 may obliquely extend between the first absorption member 210 and the second absorption member 220 to form an angle with the radially outward direction D2. As an example, as illustrated in FIG. 8, the third absorption member 230 may extend in a curved shape.

Meanwhile, when considering the absorber 200 having the above-described shape, the absorber 200 may be distorted during rotation of the wheel. However, according to the embodiment of the present disclosure, because the connector 300 located in the axial direction D1 of the wheel supports the distortion of the absorber 200 that may occur during the rotation of the wheel, the wheel may travel without any problem during the rotation thereof.

Frame 100

As illustrated in FIG. 1, the frame 100 may include first to third frame members 110, 120, and 130. The first frame member 110 may be connected to a side of the absorber 200 in the axial direction D1. The second frame member 120 may be connected to a side of the absorber 200 on an opposite side to the axial direction D1. That is, the absorber 200 may be disposed between the first frame member 110 and the second frame member 120. The first frame member 110 and the second frame member 120 may have corresponding shapes.

Figure 9:
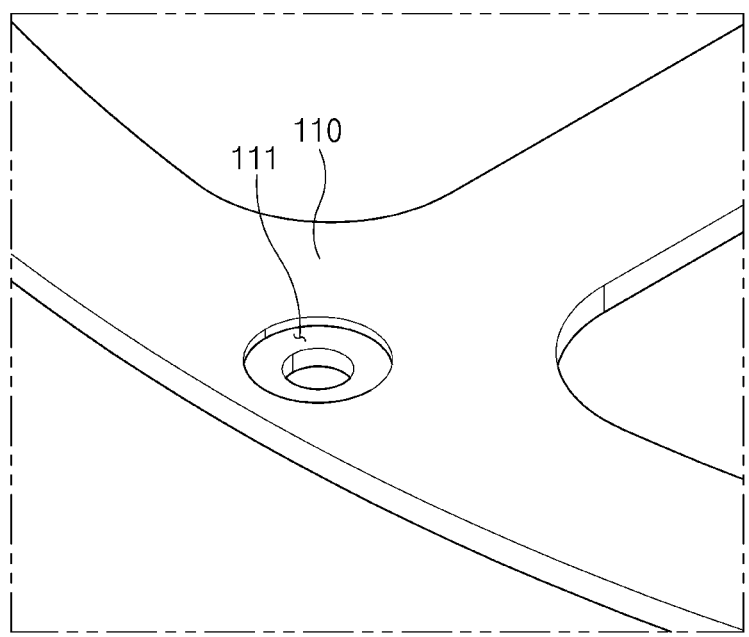
FIG. 9 is an enlarged view illustrating a first frame member of a wheel according to an embodiment of the present disclosure.

FIG. 9 is an enlarged view illustrating a first frame member of a wheel according to an embodiment of the present disclosure. A bearing groove 111, as illustrated in FIG. 9, may be formed in the first frame member 110. The third bearing 430 may be seated in the bearing groove 111.

As in the first frame member 110, a bearing groove (not illustrated), in which the fourth bearing 440 may be seated, may be additionally formed in the second frame member 120.

The third frame member 130 may extend in the axial direction D1, and may connect the first frame member 110 and the second frame member 120. As an example, the third frame member 130 may connect a distal end of the first frame member 110 in the radially inward direction D3 and a distal end of the second frame member 120 in the radially inward direction D3.

Movement of Wheel

Hereinafter, movement of the wheel according to an embodiment of the present disclosure will be described with reference to the above-described components and the drawings. FIG. 3 may be referenced for the movement of the wheel according to an embodiment of the present disclosure. For convenience of description, with reference to a time when the second absorption member 220 is rotated on the ground surface and a portion thereof contacts the ground surface, an area of the second absorption member 220, which contacts the ground surface due to the self-weight of the frame 100, is referred to as a contact area AR1 and an area of the second absorption member 220, which does not contact the ground surface, is referred to as a noncontact area AR2.

As the wheel is rotated and moved while contacting the ground surface, the first absorption member 210 may be moved adjacent to the contact area AR1. Then, the guide member 320 of the connector 300 disposed adjacent to the contact area AR1 is moved in the radially inward direction D3. Furthermore, according to the situation, the (1-2)-th part 312 may be rotated about the first shaft 340.

Furthermore, the noncontact area AR2 of the second absorption member 220, which does not contact the ground surface may be spaced apart from the first absorption member 210 by a restoring force of the third absorption member 230. Then, the guide member 320 of the connector 300 disposed adjacent to the noncontact area AR2 is moved in the radially outward direction D2.

The wheel according to the embodiment of the present disclosure may be moved while repeating the process.

Movable Object

Figure 10:
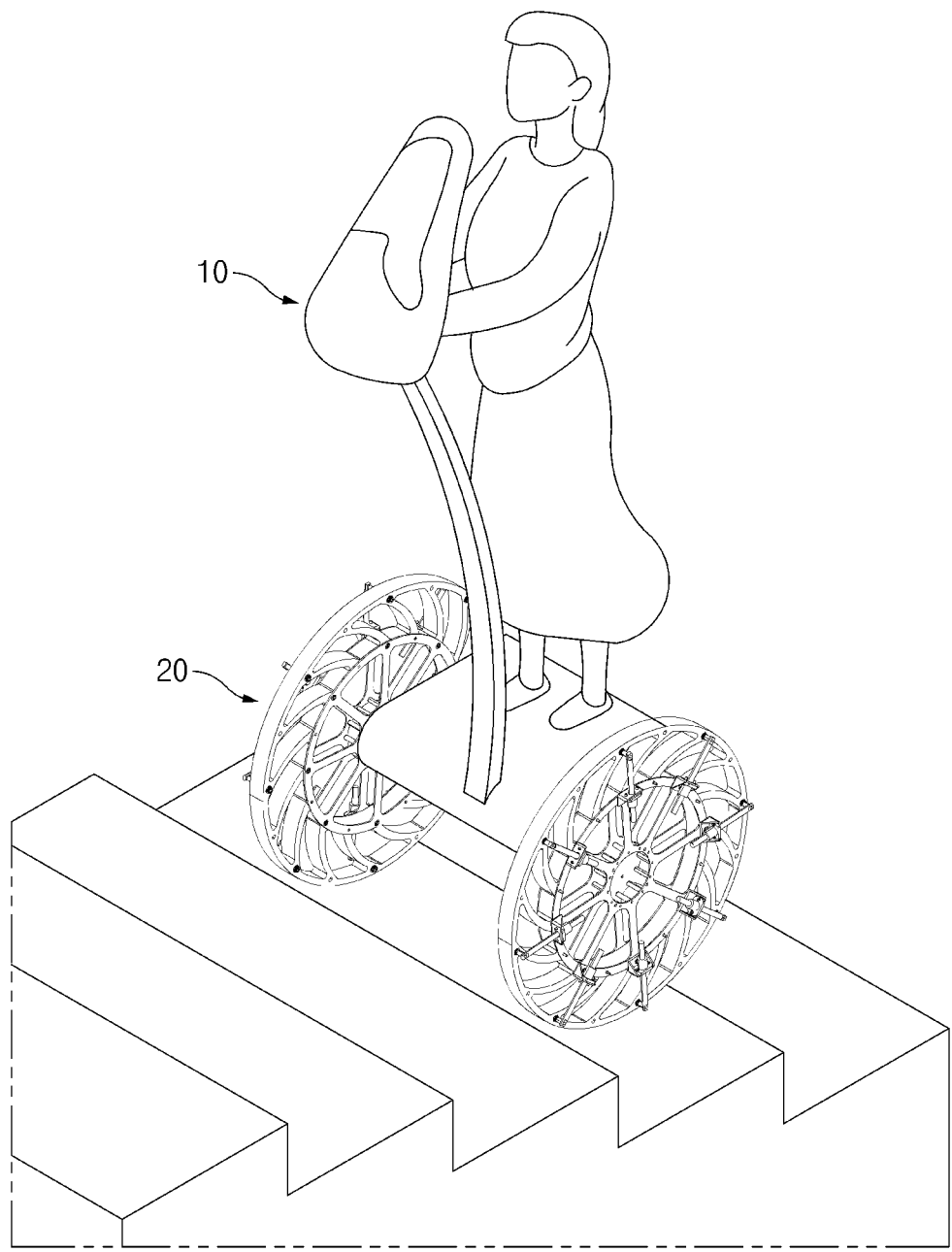
FIG. 10 is a view illustrating a movable object including a wheel according to an embodiment of the present disclosure.

FIG. 10 is a view illustrating a movable object including a wheel according to an embodiment of the present disclosure. Hereinafter, the movable object including the wheel according to the embodiment of the present disclosure will be described with reference to FIG. 10 and the above-described drawings. In particular, the above-described contents may be referenced for the description of the wheel according to the embodiment of the present disclosure.

The movable object according to the embodiment of the present disclosure may include a body 10 and a wheel 20. The body 10 may include a shaft. The wheel may be coupled to the shaft to be rotatable. As illustrated in FIG. 1, the wheel 20 (see FIG. 10) according to the embodiment of the present disclosure may include the frame 100, the absorber 200, and the connector 300. The frame 100 may be coupled to the shaft to be rotatable. The absorber 200 may be coupled to a side of the frame 100 in the radially outward direction D2. The connector 300 may connect the absorber 200 and the frame 100. A portion of the connector 300 may be movable along the radially outward direction D2 and the radially inward direction D3 of the frame 100, and another portion of the connector is rotatable on a plane that crosses the axial direction D1, in which the shaft extends.

In the movable object according to the embodiment of the present disclosure, as illustrated in FIG. 10, the number of the wheels may be variously applied within a range that may be changed by an ordinary person in the art, and for example, may be two, or one or three as well.

According to embodiments of the present disclosure, because the connector that connects the frame and the absorber is coupled to the frame and the absorber to be rotatable, surface-frictions may be reduced, and oil for lubrication may be unnecessary.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure are not provided to limit the technical spirits of the present disclosure but are provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A wheel comprising:
   a frame configured to rotate about an axial direction;
   an absorber coupled to a side of the frame in a radially outward direction; and
   a connector connecting the absorber and the frame, wherein a guide member of the connector is movable only along the radially outward direction and a radially inward direction of the frame, and a first connection member of the connector is rotatable on a plane that crosses the axial direction,
   wherein the first connection member includes a first opening opened toward the radially outward direction, and is connected to the frame to be independently rotatable; and
   wherein the guide member has a portion inserted into the first opening, the guide member extending along the radially outward direction, having a distal end in the radially outward direction connected to the absorber, and being movable only along the radially outward direction and the radially inward direction with respect to the first connection member.

2. The wheel of claim 1, wherein the first connection member comprises:
   a first part formed to be perpendicular to the radially outward direction and having the first opening; and
   a second part being perpendicular to the first part and connected to the frame to be rotatable.

3. The wheel of claim 2, wherein the connector further comprises a second connection member coupled to a surface of the first part in the radially inward direction and through which the guide member passes.

4. The wheel of claim 3, wherein the connector further comprises a first shaft extending in the axial direction, coupled to the second part to be rotatable, and passing through the frame, the absorber, and the second part.

5. The wheel of claim 4, wherein the guide member comprises:
   a guide member body extending toward the radially outward direction; and
   an insertion hole formed at a distal end of the guide member body in the radially outward direction; and
   wherein the connector further comprises a second shaft extending in the axial direction, inserted into the insertion hole to be rotatable, and passing through a distal end of the absorber in the radially outward direction.

6. The wheel of claim 5, wherein the connector further comprises:
   a first spacer inserted between the absorber and the first shaft and supporting the first shaft; and
   a second spacer inserted between the absorber and the second shaft and supporting the second shaft.

7. The wheel of claim 6, further comprising:
   a first bearing disposed between the absorber and the guide member and surrounding the second shaft; and
   a second bearing disposed between the absorber and a distal end of the second shaft in an opposite direction to the axial direction and surrounding the second shaft.

8. The wheel of claim 6, further comprising:
   a first bearing disposed between the absorber and the guide member and surrounding the second shaft; or
   a second bearing disposed between the absorber and a distal end of the second shaft in an opposite direction to the axial direction and surrounding the second shaft.

9. The wheel of claim 1, wherein the first connection member and the guide member are spaced apart from the frame in the axial direction.

10. The wheel of claim 1, wherein the frame comprises:
    a first frame member connected to a first side of the absorber in the axial direction;
    a second frame member connected to a second side of the absorber in an opposite direction to the axial direction; and
    a third frame member extending in the axial direction and connecting the first frame member and the second frame member.

11. The wheel of claim 1,
    wherein the absorber comprises:
    a circular first absorption member connected to the frame;
    a circular second absorption member spaced apart from the circular first absorption member in the radially outward direction; and
    a third absorption member connecting one point of the circular first absorption member and one point of the circular second absorption member.

12. The wheel of claim 11, wherein the third absorption member is configured to elastically support the circular second absorption member on the circular first absorption member.

13. The wheel of claim 11, wherein the third absorption member extends between the circular first absorption member and the circular second absorption member in an inclined direction to form an angle with the radially outward direction.

14. The wheel of claim 13, wherein the third absorption member extends in a curved shape.

15. The wheel of claim 13, wherein the first to third absorption members are integrally formed.

16. A wheel comprising:
    a frame configured to rotate about an axial direction;
    an absorber coupled to a side of the frame in a radially outward direction; and
    a connector connecting the absorber and the frame, wherein a guide member of the connector is movable along the radially outward direction and a radially inward direction of the frame, and a first connection member of the connector is rotatable on a plane that crosses the axial direction, wherein the frame comprises:
a first frame member connected to a first side of the absorber in the axial direction;
a second frame member connected to a second side of the absorber in an opposite direction to the axial direction; and
a third frame member extending in the axial direction and connecting the first frame member and the second frame member,
wherein the third frame member connects a distal end of the first frame member in the radially inward direction and a distal end of the second frame member in the radially inward direction.

17. The wheel of claim 16, wherein the connector further comprises:
a first shaft extending in the axial direction and passing through the absorber; and
wherein the wheel comprises at least one of:
a third bearing disposed between the first frame member and the connector and surrounding the first shaft; and
a fourth bearing disposed between the second frame member and a distal end of the first shaft, in an opposite direction to the axial direction, and surrounding the first shaft.

18. A movable object comprising:
a body including a shaft; and
a wheel coupled to the shaft to be rotatable, wherein the wheel comprises:
a frame coupled to the shaft to be rotatable;
an absorber coupled to a radially outer side of the frame; and
a connector connecting the absorber and the frame, wherein a guide member of the connector is configured to be movable only along a radially outward direction and a radially inward direction of the frame, and a first connection member of the connector is configured to be rotatable on a plane that crosses an axial direction in which the shaft extends,
wherein the first connection member includes a first opening opened toward the radially outward direction, and is connected to the frame to be independently rotatable; and
wherein the guide member has a portion inserted into the first opening, the guide member extending along the radially outward direction, having a distal end in the radially outward direction connected to the absorber, and being movable only along the radially outward direction and the radially inward direction with respect to the first connection member.

* * * * *